United States Patent [19]

Gropper et al.

[11] 3,987,020
[45] Oct. 19, 1976

[54] MANUFACTURE OF ETHYLENE POLYMERS

[75] Inventors: Hans Gropper; Dieter Oeder, both of Ludwigshafen; Friedrich Urban, Limburgerhof, all of Germany

[73] Assignee: BASF Aktiengesellschaft, Ludwigshafen (Rhine), Germany

[22] Filed: Apr. 18, 1975

[21] Appl. No.: 569,271

[30] Foreign Application Priority Data

May 9, 1974   Germany............................ 2422546

[52] U.S. Cl............................ 526/352; 526/64.78; 526/82; 526/88
[51] Int. Cl.$^2$..................... C08F 2/02; C08F 2/38; C08F 10/02
[58] Field of Search.................... 260/94.9 R, 94.9 P

[56] References Cited
UNITED STATES PATENTS

| | | | |
|---|---|---|---|
| 2,897,183 | 7/1959 | Christl et al. ................ | 260/94.9 R |
| 3,536,693 | 10/1970 | Schrader et al. ............... | 260/94.9 R |
| 3,575,950 | 4/1971 | Gleason et al. ................ | 260/94.9 R |
| 3,692,763 | 9/1972 | Van Saane et al. ............. | 260/94.9 R |
| 3,756,996 | 9/1973 | Pugh et al. .................... | 260/94.9 R |

*Primary Examiner*—Alan Holler
*Attorney, Agent, or Firm*—Johnston, Keil, Thompson & Shurtleff

[57] ABSTRACT

Ethylene polymers are produced at pressures between 1000 and 4000 atmospheres and temperatures of from 120° to 300° C in a reaction zone having an $l/d$ ratio of from 10:1 to 20:1 while shear forces act on the reaction mixture. The ethylene is fed continuously and radially to the reaction zone at a velocity of from 2 to 20 m/sec. The average residence time of the reaction mixture in the reaction zone is from 20 to 90 seconds. The products show a broad molecular weight distribution and are particularly advantageous for use as extruded coatings.

2 Claims, No Drawings

MANUFACTURE OF ETHYLENE POLYMERS

This invention relates to a process for the manufacture of ethylene polymers under high pressure and at elevated temperature in the presence of free-radical catalysts in a reaction zone having an $l/d$ ratio of from 10:1 to 20:1 to give ethylene polymers having a broad bimodal molecular weight distribution.

In most of the prior art processes for high-pressure polymerization of ethylene, polymers having relatively narrow molecular weight distribution are obtained, but it is very advantageous in a number of applications, e.g. extrusion coating, to use polyethylenes having a broad molecular weight distribution.

One process for the manufacture of ethylene polymers having such a broad molecular weight distribution is described, for example, in Belgian Pat. No. 670,483. In this case, ethylene is polymerized in a stirred autoclave of which the reaction chamber is subdivided into three successive zones. In each of the zones specific reaction conditions must be maintained and different mixing effects achieved by using different types of stirrer.

The U.K. Pat. No. 1,071,305 describes another process for the manufacture of polyethylene having a broad polymodal molecular weight distribution which consists in polymerizing ethylene in two parallel reactors. In one of these reactors a product having a high molecular weight is produced whilst in the other a waxy product of low molecular weight is obtained. The reaction mixtures are then mixed prior to their passage to the separator for relaxation.

These prior art processes suffer from the disadvantage that they involve considerably more expensive techniques and apparatus than the conventional high pressure process for the polymerization of ethylene.

It is an object of the present invention to provide a process of the kind described above which suffers from the above drawbacks either not at all or only to a considerably lesser extent.

According to the invention this object is achieved by feeding at least 80% of the ethylene, together with the catalyst and, if desired, a chain stopper, to a specific point of the reaction zone under specific conditions.

The present invention relates to a process for the manufacture of ethylene polymers having a broad bimodal molecular weight distribution by polymerizing ethylene at pressures between 1000 and 4000 atmospheres and temperatures of 120° to 300° C in the presence of free-radical catalysts and, optionally, in the presence of a chain stopper, in a reaction zone having an $l/d$ ratio of from 10:1 to 20:1, the reaction mixture being subjected to shear forces. The process is characterized in that at least 80% of the ethylene, based on the total amount of ethylene introduced, is fed, in admixture with the catalyst and, optionally, together with a chain stopper, continuously to the reaction zone radially thereto and at a point situated at a distance of from 25 to 60% of the total length of the reaction zone from its top end, the reaction mixture entering the reaction zone at said feed point at a velocity of from 2 to 20 m/sec and remaining in the reaction zone for an average residence time of from 20 to 90 seconds.

The process of the invention is equally suitable for the manufacture of homopolymers and copolymers of ethylene showing a broad molecular weight distribution. Particularly suitable comonomers are ethylenically unsaturated hydrocarbons of from 3 to 12 carbon atoms such as propylene and butene-(1). However, any other compound may be used which copolymerizes with ethylene under these conditions. Examples thereof are vinyl esters of saturated carboxylic acids of from 2 to 18 carbon atoms, for example vinyl acetate and vinyl propionate; $\alpha,\beta$-unsaturated carboxylic acids such as acrylic acid, methacrylic acid and fumaric acid; and esters of said carboxylic acids derived from alcohols of from 1 to 20 carbon atoms, for example n-butyl acrylate. Other suitable comonomers are carbon monoxide, sulfur dioxide, amides, anhydrides and other derivatives of unsaturated acids (e.g. acrylamide and maleic anhydride), vinyl ethers and vinyl ketones. Ethylene polymers may be prepared which contain one or more of said comonomers in polymerized form. To this end, the mixture of ethylene and one or more of said comonomers containing from 0.1 to 50% by weight, based on the mixture, of comonomer is polymerized. Where, for convenience, only the homopolymerization of ethylene is mentioned below, the statements made in connection therewith may be applied analogously to the copolymerization of ethylene with the said comonomers.

By free-radical catalysts we mean the polymerization initiators known to be suitable for the high-pressure polymerization of ethylene, for example peroxides, hydroperoxides and azo compounds. These initiators may be used singly or in the form of mixtures of two or more thereof. The said free-radical catalysts are used in amounts of from 2 to 50 ppm, based on ethylene.

The polymerization may also be carried out, if necessary, in the presence of chain stoppers. Here again, all substances are suitable which are known to be useful in the high-pressure polymerization of ethylene. Examples of suitable chain stoppers are saturated aliphatic hydrocarbons such as propane, n-butane and isobutane, saturated cyclic hydrocarbons such as cyclopentane and cyclohexane, and unsaturated aliphatic hydrocarbons such as propylene. Also suitable are saturated aldehydes and ketones, alcohols, aromatics hydrocarbons, aldehydes of carboxylic acids and hydrogen. The chain stopper are added to the reaction mixture in amounts of from 0.05 to 10% by weight, based on the weight of ethylene used.

The polymerization of the ethylene is normally carried out at pressures between 1000 and 4000 atmospheres. The polymerization temperatures lie between 120° and 300° C, preferably between 180° and 280° C. Polymerization is carried out continuously in a reaction zone having a $l/d$ ratio of from 10:1 to 20:1. The reaction mixture is subjected to shear forces in the reaction zone. The actual manner in which these shear forces are exerted and their magnitude have no critical influence on the process of the invention.

Such polymerization processes are known per se. Suitable apparatus for carrying out such processes are stirred autoclave reactors. Instead of giving further details, reference is made to "Ullmann's Enzyklopaedie der Technischen Chemie", Vol. 3, 4th Edition (published by Verlag Chemie, Weinheim/Bergstrasse, 1973), the chapter headed "Reaktionsapparate; Reaktoren fuer exotherme Reaktionen", page 323 or to L. S. Albright, "High Pressure Processes for Polymerizing Ethylene", Chemical Engineering, Vol. 73, (1966), issue dated Dec. 19, pp. 113 to 120.

The decisive factors in the present invention are the point at which the ethylene is fed to reaction zone in admixture with the other reactants and the manner in which this is carried out. It is surprising to find that these factors can influence the properties of the polymer to a considerable extent.

According to the present invention, the ethylene is mixed with the catalyst and, if necessary, a chain stopper, prior to feeding to the reaction zone. To this end, a catalyst solution is metered to the fresh stream of ethylene gas at a point just before entry thereof to the reaction zone, by means of well-known metering apparatus. The solvents used for the catalyst are inert liquids, particularly benzene, n-hexane and isooctane. The chain stopper, if used, is added to the fresh ethylene gas at the same point, together with the catalyst solution, but it can be fed to the ethylene at a lower pressure stage if desired.

According to the invention, the reaction mixture is fed to the reaction zone at a point situated at a distance of from 25 to 60% of the total length of the reaction zone from its top end. Preferably, the distance between the feed point and the top edge of the reaction zone is from 25 to 50% of the total length. If the reaction mixture is fed to the reaction zone at a point outside these limits, the resulting polymers do not exhibit the desired broad molecular weight distribution but have a narrower symmetrical distribution of molecular weight. It is also important for the reaction mixture to be fed to the reaction zone at said point in a radial direction. By this we mean that the reaction mixture enters the reaction zone at right angles to the longitudinal direction thereof. If this is not the case, the resulting polymers again fail to show the desired properties. If, for example, the reaction mixture is fed to the reaction zone at a point which is situated at a distance of from 25 to 60% of the total length of the reaction zone from its top end, the direction of feed being not radial but axial, i.e. the mixture enters the reaction zone in its longitudinal direction, polymers are formed which have a relatively narrow and symmetrical molecular weight distribution. The fresh stream of ethylene containing the catalyst and, optionally, a chain stopper is fed to the reactor by means of conventional compressors.

The reaction mixture should enter the reaction zone at a velocity of from 2 to 20 m/sec and preferably from 4 to 10 m/sec. It is advantageous to keep the temperature of the ethylene gas stream entering the reaction zone as low as possible, since the degree of conversion increases with increasing difference between the temperature of the ethylene gas entering the reaction zone and the temperature at which the reaction is carried out. In the process of the invention, the temperature of the fresh stream of ethylene gas may be lowered greatly, for example to $-10°$ C, without impairing the course of the polymerization reaction. Normally, the ethylene is fed to the reaction zone at a temperature of from $0°$ to $60°$ C. The residence times of the reaction mixture in the reaction zone range from 20 to 90 seconds. The reaction mixture is then discharged at the bottom of the reaction zone and is flashed to a separator.

Usually, all of the fresh ethylene gas is fed to the reaction zone at the aforementioned feed point of the invention. Alternatively, however, it may be desirable to remove a small portion of the fresh stream of ethylene gas from the main stream before the latter enters the reaction zone and to pass said partial stream to some other point of the reaction zone. This branch stream of cold ethylene gas may be used, for example in reactors in which the stirrer is driven by a motor which is present in the pressure chamber of the reactor and is thus subjected to ethylene pressure, in order to scavenge said driving motor to avoid polymer deposits therein. The amount of cold ethylene necessary for this purpose and removed from the main stream of fresh ethylene gas is small compared with the total amount of gas. If, in the process of the invention, a portion of the fresh stream of ethylene gas is removed from the main stream before the latter enters the reaction zone, the amount thereof should not be more than 5 to 10% and should never be more than 20% of the total amount of ethylene gas used. At least 80% of the fresh ethylene gas must be fed to the reaction zone in the manner described in the present invention together with catalyst and, optionally, a chain stopper.

The process of the invention produces polymers having a broad and asymmetrical molecular weight distribution and high melt elasticity. The measure of the breadth of molecular weight distribution is taken to be the ratio of the average weight to the number average of the molecular weight ($\overline{M}_w/\overline{M}_n$).

The advantages of the process of the invention over prior art processes are mainly to be seen in the considerably simpler technique and apparatus used, since the desired properties of the polymers may be determined merely by the choice of conditions under which the reaction mixture enters the reaction zone. The extent and nature of the shear forces subjected to the reaction mixture in the reaction zone are also of no decisive importance, i.e. reactors having any type of stirring equipment may be used. Furthermore, it is possible to achieve conversions of more than 20% in the process of the invention.

The ethylene polymers produced in the present invention are mainly used for extrusion coating purposes.

The invention is illustrated with reference to the following Examples. The melt index of the polymers produced was determined according to DIN 53,735 at $190°$ C using a load of 2.16 kg. The molecular weight distribution was determined by examining the polymers by means of gel permeation chromatography. Information on the melt elasticity of the polymers was given by measuring their memory effect. This was done by using an apparatus employed according to DIN 53,735 for measuring the melt index. The force with which the melt is extruded through the nozzle was selected so as to give a constant egress rate of 1.5 g/10 minutes with all products. The memory effect is given by the percentage increase in diameter of the extrudate over that of the nozzle.

EXAMPLE 1

300 kg/hr of ethylene are passed into an autoclave having a capacity of 10:1 and an $l/d$ ratio of 13:1 under a pressure of 2000 atmospheres and at a temperature of $15°$ C. To control the average molecular weight of the polymer, 6.5 kg/hr of cyclohexane are added to the ethylene. By metering 7.6 molar ppm of t-butyl peracetate, based on the ethylene, to the fresh ethylene gas to act as catalyst, a temperature of $260°$ C is maintained in the reactor.

The reaction mixture is fed at a rate of 270 kg/hr to the reactor through a radial bore in the wall of the autoclave, which bore is at a point exactly half way along the reactor and has a diameter of 6.3 mm. The mixture enters the reaction chamber at a velocity of 4.8 m/sec. 30 kg/hr of fresh gas are removed from the main stream and are passed through the driving motor of the stirrer before entering the reaction chamber to act as scavenging gas for said driving motor.

Homogenization of the contents of the reactor is effected by means of a stirrer having 18 superposed stirring elements. The elements are disposed on the stirrer shaft in such a manner that the directions of conveyance of any two successive elements are opposed to each other. The speed of the stirrer is 1000 rpm.

The average residence time of the reaction mixture in the reactor is about 60 seconds. The mixture is flashed to a separator at the bottom of the reactor. The degree of conversion is 19%, giving a polymer having a melt index of 4.0 g/10 minutes and a broad asymmetrical molecular weight distribution having a $\overline{M}_w/\overline{M}_n$ of 50. The product has a large melt elasticity, as shown by a memory effect of 60%. Its density is 0.923 g/cm$^3$.

EXAMPLE 2

400 kg/hr of ethylene are fed to the autoclave described in Example 1 together with 3.7 kg/hr of propylene and 16 molar ppm/hr of t-butyl peracetate, based on ethylene, acting as catalyst. The temperature of the fresh reaction mixture is 30° C.

The reaction mixture is fed to the reactor as in Example 1 except that the point of feed is at a distance of 25% of the total length from the top end of the autoclave. The mixture enters at a velocity of 7.6 m/sec and its residence time in the reactor is 45 seconds. 380 kg/hr of fresh gas are fed to the reactor at the aforementioned point, whilst 20 kg/hr of said gas are passed through the motor casing to scavenge the motor.

Using a reaction pressure of 2100 atmospheres and a reaction temperature of 260° C, the degree of conversion is 18% and the product has a melt index of 6.8 g/10 minutes and a density of 0.918 g/cm$^3$. The product has a broad molecular weight distribution $\overline{M}_w/\overline{M}_n$ of 30.0 and a memory effect of 54%.

EXAMPLE 3

Example 1 is repeated except that 320 kg/hr of ethylene are passed to the reactor together with 5.5 kg/hr of cyclohexane and 3.3 molar ppm/hr of di-t-butyl peroxide and the temperature of the fresh reaction mixture is 100° C. 295 kg/hr of fresh gas are passed to the reactor at a point described in Example 1, whilst 25 kg/hr are passed through the motor. The degree of conversion is 12% and the product has a melt index of 4.0 g/10 minutes and a density of 0.924 g/cm$^3$. This polymer also has a broad molecular weight distribution $\overline{M}_w/\overline{M}_n$ of 22.7 and a memory effect of 53%.

COMPARATIVE EXAMPLE 1

Example 3 is repeated except that of the reaction mixture consisting of 320 kg/hr of ethylene, 6 kg/hr of cyclohexane and 6 molar ppm/hr of di-t-butyl peroxide, 295 kg/hr are passed gradually to the reactor at the top end of the reaction chamber. The temperature of the fresh stream of gas is 100° C. Lower gas temperatures are not possible with this mode of operation. The reaction pressure is 2000 atmospheres and the temperature at which the reaction is carried out is 260° C. The gas enters the reaction chamber at a velocity of 5.9 m/sec. The average residence time in the reactor is about 56 seconds.

The degree of conversion is 12%, giving a polymer having a melt index of 4.0 g/10 minutes and a density of 0.930 g/cm$^3$. However, the polymer has a narrow molecular weight distribution $\overline{M}_w/\overline{M}_n$ of 14.3 and a memory effect of only 30%, indicating a low melt elasticity.

COMPARATIVE EXAMPLE 2

In a further experiment, 300 kg/hr of ethylene, 4.8 kg/hr of cyclohexane and 4.9 molar ppm/hr of t-butyl acetate are fed to the autoclave described in Example 1 at a pressure of 2000 atmospheres. The mixture enters the autoclave not through a radial bore but through a tube mounted in the top closure plate of the autoclave. This tube is close to the inner surface of the autoclave wall and extends to a point half way along the reaction chamber. The reaction mixture has an inlet temperature of 100° C and a velocity of 8.3 m/sec. The temperature at which the reacton is carried out is 260° C and the average residence time in the reactor is about 60 seconds. The degree of conversion is 12.3%, giving a polymer having a melt index of 4.0 g/10 minutes and a density of 0.927 g/cm$^3$. This product also has a narrow molecular weight distribution $\overline{M}_w/\overline{M}_n$ of 15.6 and its memory effect of 38% indicates a relatively low melt elasticity.

We claim:

1. In a process for the manufacture of a polyethylene having a broad bimodal molecular weight distribution by polymerization of ethylene at pressures between 1000 and 4000 atmospheres and temperatures of from 120° to 300° C in the presence of a free-radical catalyst and, optionally, a chain stopper in a vertical reaction zone having an $l/d$ ratio of 10:1 to 20:1, the reaction mixture being subjected to shear forces and then discharged at the bottom end of the reaction zone, the improvement which comprises:

continuously feeding at least 80% of the ethylene, based on the total amount of ethylene, to the reaction zone together with the catalyst and, if used, the chain stopper in a radial direction at an inlet point situated at a distance of from 25 to 60% of the total length of the reaction zone from its top end, the reaction mixture entering the reaction zone at said inlet point at a velocity of from 2 to 20 m/sec and remaining in the reaction zone for an average residence time of from 20 to 90 seconds.

2. A process as claimed in claim 1, wherein the reaction mixture is fed to the reaction zone at a point situated at a distance of from 25 to 50% of the total length of the reaction zone from its top end.

* * * * *